April 18, 1961 C. H. WILLSEY 2,979,746
EGG WASHING MACHINE
Filed May 3, 1957 4 Sheets-Sheet 1
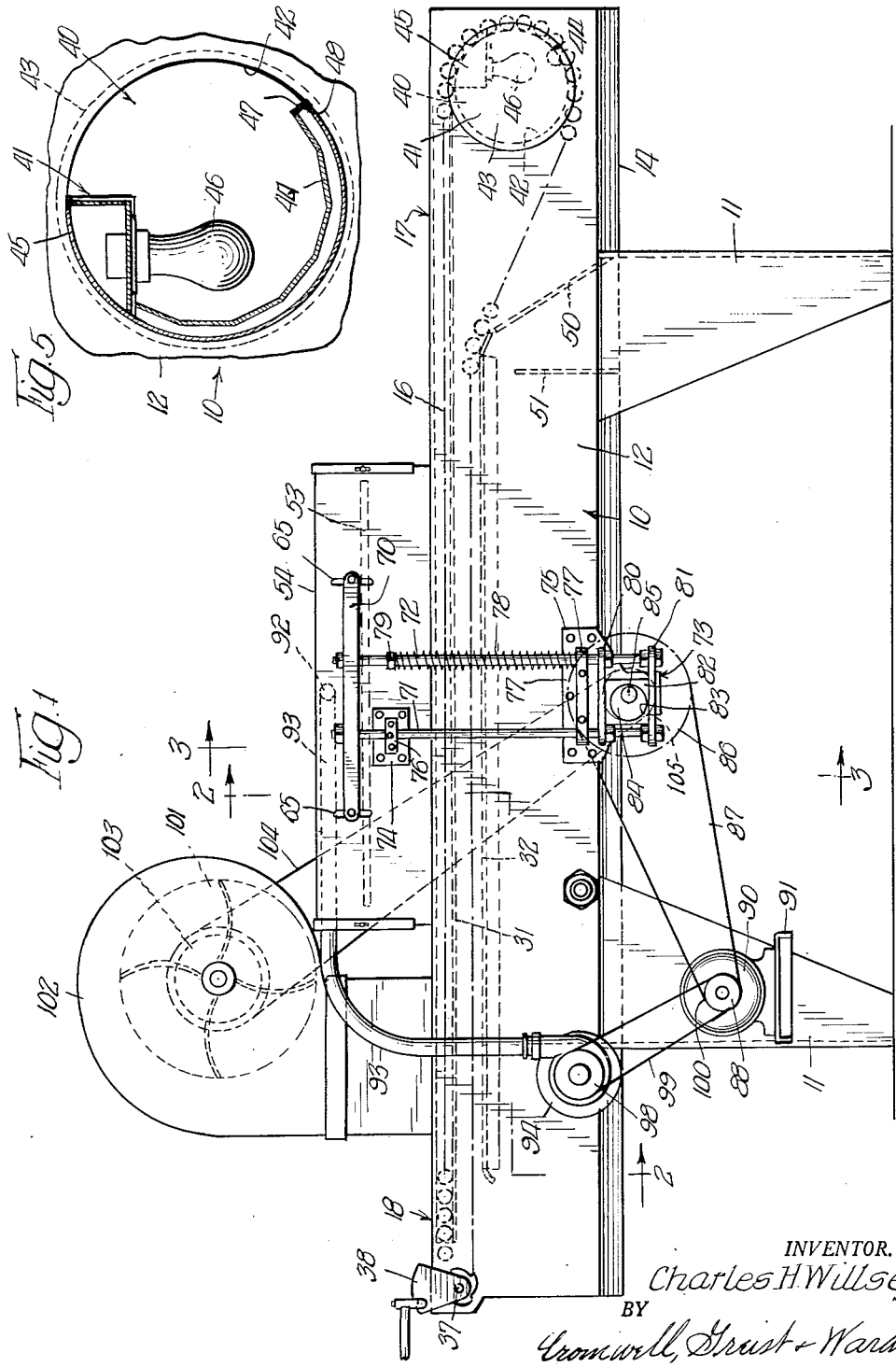
INVENTOR.
Charles H. Willsey,
BY
Cromwell, Greist & Warden
ATTYS

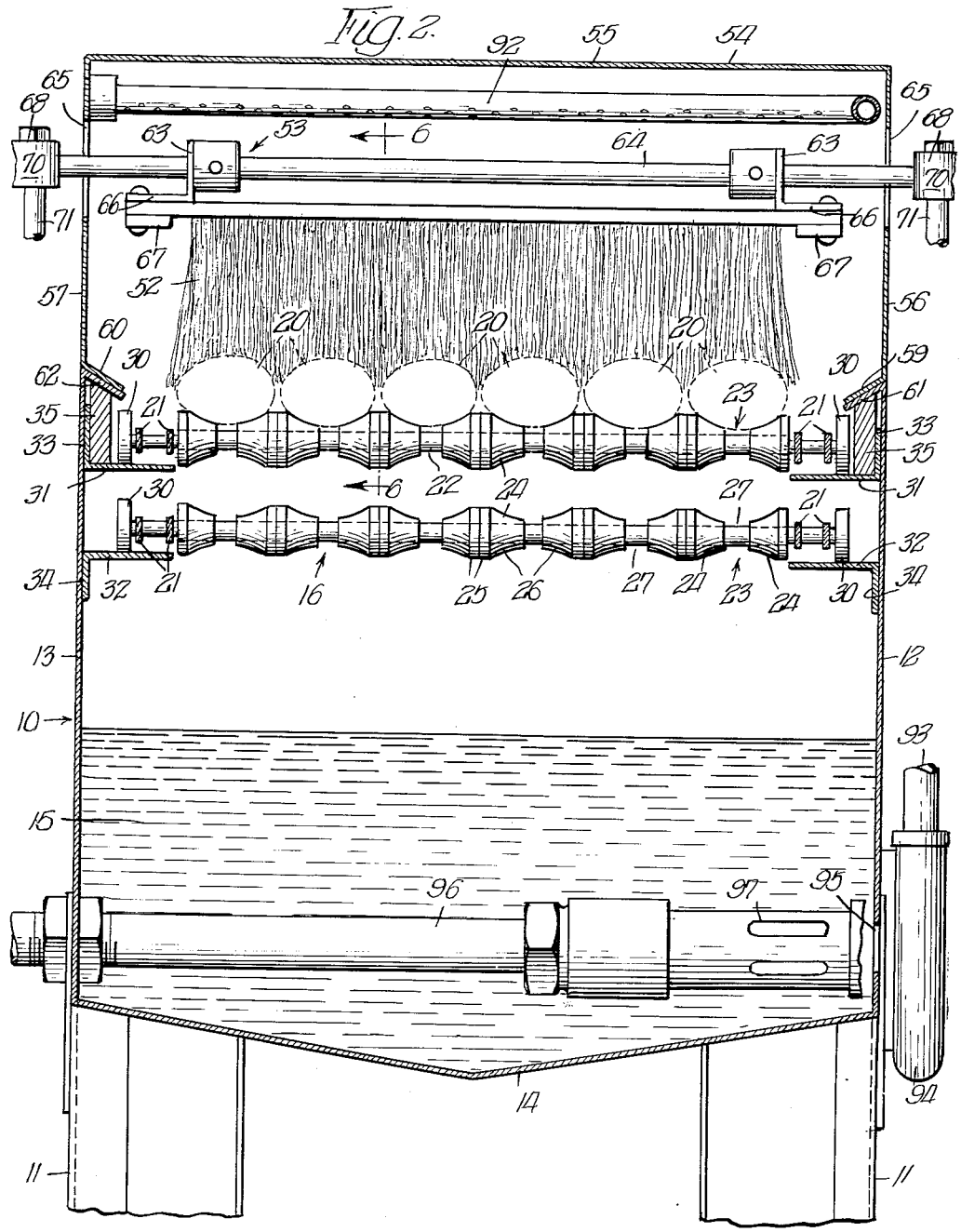

April 18, 1961
C. H. WILLSEY
2,979,746
EGG WASHING MACHINE
Filed May 3, 1957
4 Sheets-Sheet 3
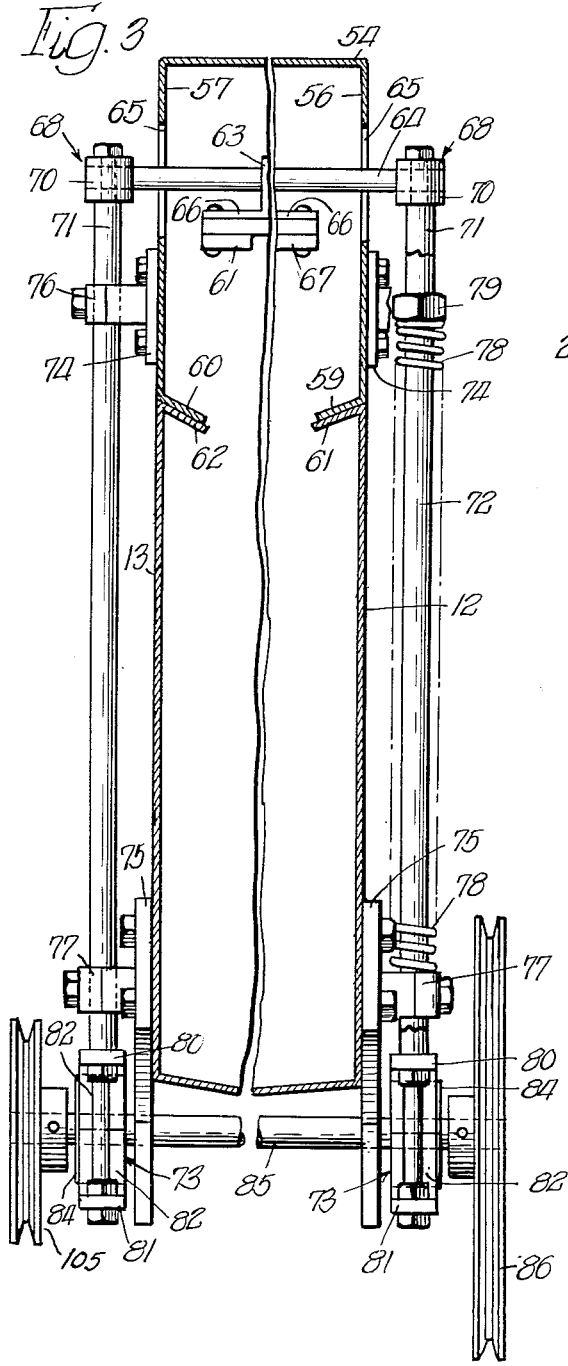
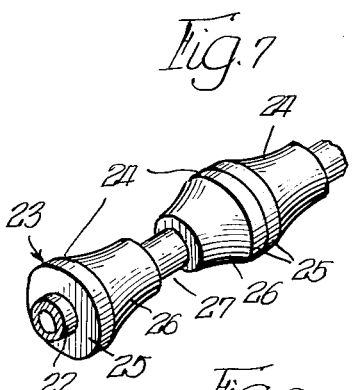
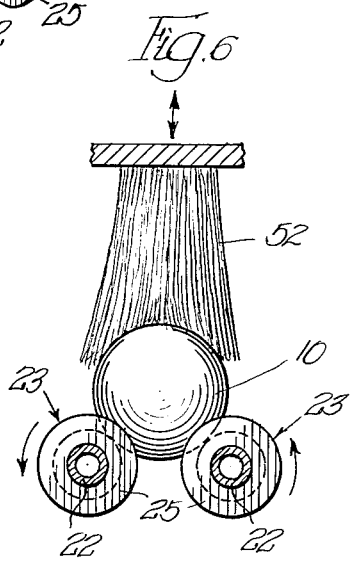
INVENTOR.
Charles H. Willsey,
BY
Cromwell, Greist & Warden
Attys April 18, 1961 C. H. WILLSEY 2,979,746
EGG WASHING MACHINE
Filed May 3, 1957 4 Sheets-Sheet 4
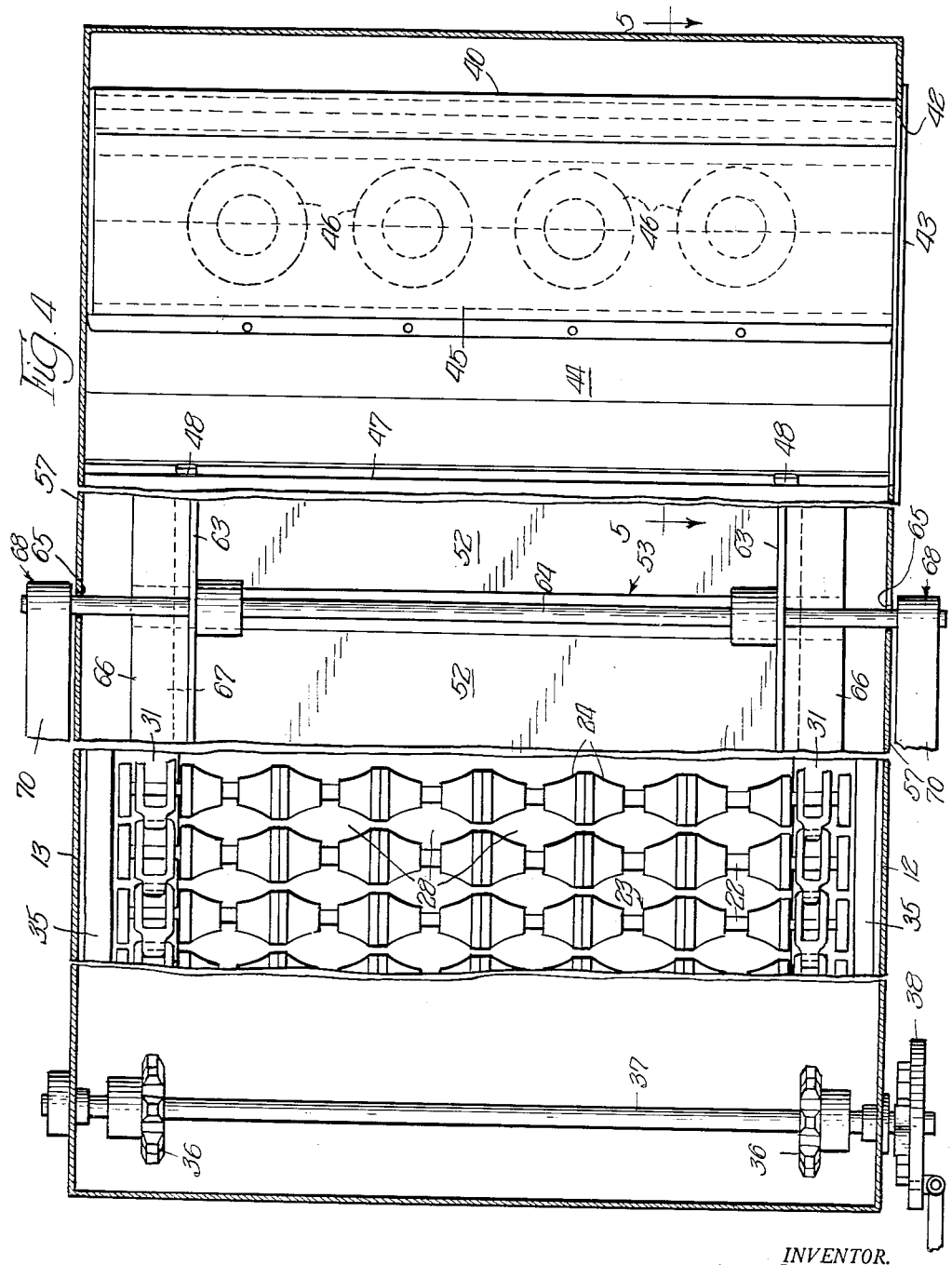
INVENTOR.
Charles H. Willsey,
BY
Cromwell, Greist & Warden
Attys

United States Patent Office

2,979,746
Patented Apr. 18, 1961

---

2,979,746

EGG WASHING MACHINE

Charles H. Willsey, Topeka, Kans., assignor to Seymour Foods, Inc., Topeka, Kans., a corporation of Kansas Filed May 3, 1957, Ser. No. 656,881

4 Claims. (Cl. 15—3.13)

This invention relates to egg handling machinery and is more particularly concerned with improvement in an apparatus for cleaning shell eggs.

It is a general object of the invention to provide a machine which will remove the accumulation of dirt which is commonly found on egg shell surfaces wherein the machine is of relatively simple construction and operates efficiently to remove the dirt from the shells and any accompanying bacterial or germ contamination which may be present therein.

It is a more specific object of the invention to provide an egg cleaning apparatus wherein the eggs are carried on a conveyor beneath vertically reciprocating brushes which are positioned to strike the surfaces of the eggs as they are advanced beneath the same with the conveyor being so constructed that the eggs are continually rotated about their longitudinal axes as they are advanced beneath the brushes so as to present the entire surface of each egg to the action of the brushes.

It is another object of the invention to provide an egg cleaning apparatus wherein the eggs are carried on a horizontal conveyor beneath vertically reciprocating bristle brushes which are arranged with the bristles in depending relation and positioned to engage the ends of the bristles against the exposed surfaces of the egg shells to thereby effect a scouring or scrubbing action for removal of dirt from the surfaces of the eggs.

It is another object of the invention to provide an egg cleaning apparatus wherein the eggs are carried by a continuously traveling conveyor beneath a series of brush elements mounted on a vertically reciprocating frame above the egg supporting run of the conveyor and wherein a cleaning fluid is supplied to the brushes to facilitate the scrubbing of the egg shell surfaces.

It is a further object of the invention to provide an egg washing apparatus in which the eggs are carried past a brushing area on a conveyor which is characterized by spaced rollers extending between side chains and arranged so that each egg is carried in a pocket between successive rollers, the rollers being rotated so that the eggs are continuously rotated about their long axes, and the pockets being formed so as to provide a maximum exposure of the egg surfaces for more effective drying as the eggs are advanced beyond the brushing area.

These and other objects and advantages of the invention will be apparent from a consideration of the washing apparatus which is shown by way of illustration in the accompanying drawings wherein:

Figure 1 is a side elevation of an egg washing machine having incorporated therein the principal features of the invention;

Figure 2 is a cross section on the line 2—2 of Figure 1 to an enlarged scale;

Figure 3 is a cross section on the line 3—3 of Figure 1 to an enlarged scale;

Figure 4 is a partial plan view of the machine with portions thereof broken away;

Figure 5 is a section taken on the line 5—5 of Figure 4;

Figure 6 is a cross section taken on the line 6—6 of Figure 2, to an enlarged scale; and Figure 7 is a perspective view of one of the roller assemblies, to an enlarged scale.

Referring to the drawings, there is illustrated an egg washing machine which embodies the principal features of the invention and which has provisions for candling the eggs at the feeding end of the machine and for drying the surfaces of the eggs at the discharge end of the machine. While the illustrated machine is adapted to be used primarily in combination with other apparatus for processing the eggs after they are washed or cleaned, it may be used alone for cleaning shell eggs prior to packaging and marketing.

The machine comprises a main supporting frame structure 10 (Figures 1 and 2) which is arranged in the form of an elongate upwardly opening washing compartment or tank having vertically extending leg structures 11 at opposite ends thereof. The main frame structure or tank 10 is generally rectangular in cross section with transversely spaced vertical side walls 12 and 13 extending upwardly at opposite side edges of a bottom wall 14 and is closed at its ends so that it is adapted to hold a supply of washing fluid 15.

An endless conveyor 16 is supported in the main frame 10 with the upper run thereof in a horizontal plane adjacent the top thereof for carrying the eggs through the machine from the feeding end, indicated at 17 (Figure 1), to the discharge end, indicated at 18. The conveyor 16 is of special construction and is arranged so that the eggs 20 carried on the upper run thereof are simultaneously rotated about their long axes as they are advanced through the machine. It comprises a pair of oppositely disposed transversely spaced side chains 21 which are connected by a series of longitudinally spaced transversely extending rod or bar members 22. Each of the cross bar members carries six pairs of egg supporting roller assemblies 23. The roller assemblies 23 are identical and are arranged on the cross bar members 22 in abutting relation. The overall length in the axial direction of the bar member 22 of each roller assembly 23 is somewhat greater than the length of the largest egg which the machine is designed to carry.

Each of the roller assemblies 23 comprises a spaced pair of identical roller sections 24 having a base portion 25 with a cylindrical periphery and an adjoining portion 26 which extends from the base 25 in the axial direction of the cross bar 22 and has a peripheral contour which is convexly curved so that each portion 26 has the general form of a truncated cone with the peripheral curvature being roughly complementary to the exterior curvature of the end portion of an egg shell of average size and shape. The two egg supporting roller sections 24 of each pair thereof are arranged with the portions 26 in confronting relation and spaced an appreciable distance axially on the cross bar 22, providing a space 27 between the ends thereof in which the egg 20 is free of contact with the roller sections 24 and permitting circulation of air over the central portion of the surface of the egg 20 for drying the same when it is advanced beyond the washing area.

The cross bars 22 which carry the roller assemblies 23 are spaced from each other in the longitudinal direction of the conveyor 16 so that each assembly 23 cooperates with the aligned assembly on the adjoining cross bar 22 to form therewith a pocket 28 (Figure 4) for receiving and confining an egg 20 while the cross bars 22 are traveling on the uppermost run of the conveyor 16.

The cross bars 22 are each rotatably connected with the chains 21 and have the ends thereof extending outwardly of the same. Rollers 30 are secured on the ends of each cross bar 22, outwardly of the chains 21, which ride on oppositely disposed pairs of inwardly directed guide flanges 31 and 32 provided by angle support members 33 and 34. The angle support members 33 and 34 are secured on the walls 12 and 13 of the main frame structure 10, in horizontal vertically spaced relation, with the uppermost member 33 extending almost the full length of the machine and supporting the upper run of the conveyor 16 in a horizontal plane. The lower support member 34 is parallel with the support member 33 and somewhat shorter. It is positioned to support a major portion of the lower return run of the conveyor 16. Bumper guide rails 35 are carried on the angle support members 33 outwardly of rollers 30, which prevent excess lateral movement of the conveyor. The rollers 30 are, of course, frictionally driven by engagement with the guide flanges 31 and 32 and rotate the cross bars 22, thereby axially rotating the eggs 20 which are in the pockets 28.

The conveyor chains 21 are carried at the discharge end 18 of the machine on a pair of sprocket members 36 which are axially spaced on a cross shaft 37. The shaft 37 is journaled in suitable bearings in the frame side walls 12 and 13 and provided with a drive mechanism at one end thereof, indicated at 38 (Figure 1), for intermittently operating the conveyor 16, to advance the eggs through the machine. The conveyor 16 is supported at the end 17 of the machine on a tube or drum-like member 40 which is secured between the side walls 12 and 13 of the main frame 10 and which also forms a support and housing for a candling apparatus 41.

The candling apparatus 41 is adapted to be removably positioned in one end of the conveyor support drum 40 through an aperture 42 provided in the side wall 12 of the main frame 10. The apparatus 41 comprises an end plate 43 and a semi-circular reflector 44 extending inwardly thereof. A support angle 45 is secured above the reflector 44 which has provision for supporting a series of light bulbs 46 in spaced relation inwardly of the end plate 43. The drum member 40 has an open inner side 47 and stop lugs 48 are provided at the bottom edge thereof to engage with the bottom edge of the reflector 44 and properly position the candling apparatus 41. The candling apparatus 41 is protected from the washing fluid by a pair of vertically extending baffle plates 50 and 51 which are arranged beneath the conveyor forwardly of the support drum 40.

A plurality of bristle brushes 52 are provided for scrubbing the surfaces of the eggs 20 which are supported on a reciprocating frame 53 mounted in a housing 54 above the upper run of the conveyor 16 near the center of the machine. The brush housing 54 comprises a top cover member 55 and depending side walls 56 and 57 at opposite sides which have bottom flanges 59 and 60 seated on the top flanges 61 and 62, respectively, of the side walls 12 and 13 of the main frame structure 10.

The brush holding frame 53 comprises a pair of laterally spaced oppositely facing angle bars 63 which are secured to two longitudinally spaced cross rods or bars 64, the latter being of sufficient length to extend at their opposite ends through vertically extending clearance slots 65 in the side walls 56 and 57 of the brush housing 54. The brushes 52 are of sufficient length to extend across the conveyor 16 and each brush is clamped at its ends to the bottom horizontal flanges 66 of the frame angle bars 63 by the clamp bars 67 with the brushes being spaced longitudinally of the machine in relatively close relation.

The brush holding frame 63 is reciprocated by vertically moving frame mechanisms 68 at opposite sides of the machine. Each frame mechanism 68 comprises a horizontal top bar 70 connecting the projecting ends of the two cross bars 64 and a pair of vertically extending thrust bars 71 and 72 which depend from the bar 70 in parallel longitudinally spaced relation and which carry at their lower ends an eccentric operating device 73. The frame formed by the vertical bars 71 and 72, the horizontal bar 70 and the eccentric device 73 is mounted for vertical reciprocation in vertically spaced upper and lower bearing brackets 74 and 75 which are mounted on the side wall 12 of the main frame structure 10. The upper bracket 74 has an outwardly projecting horizontal bearing member 76 which is apertured to receive only the vertical frame bar 71 while the lower bracket 75 has a horizontal bearing bar 77 which is apertured to receive both of the vertical frame bars 71 and 72. The vertical frame bar 72 carries a compression spring 78 which extends between the bearing bar 77 of the lower bracket 75 and a stop nut or collar 79 adjacent the upper end thereof.

The eccentric device 73 which moves the vertical frame 68 comprises a pair of horizontal plate or bar members 80 and 81 which are fixed to the lower ends of the vertical frame bars 71 and 72 in vertically spaced relation. A housing 82 is slidably mounted between the plates 80 and 81 which has a circular aperture 83 for receiving an eccentric disc 84. The eccentric disc 84 is mounted on a cross shaft 85 which is journaled, by suitable bearings, in the side walls 12 and 13 of the main frame structure 10. The housing 82 has a circular translational movement about the shaft 85 by virtue of eccentric 84 carried by shaft 85 and journaled in the housing block 82. A pulley 86 is provided on the one end of the cross shaft 85 and connected by a drive belt 87 with the drive pulley 88 on an operating motor 90 which is mounted on a bracket 91 supported on the leg structure 11. The cross shaft 85 is connected at its opposite end to the vertical frame mechanism 68 on that side of the machine and rotation of the pulley 86, of course, moves the vertical frame mechanisms 68 in unison and reciprocates the brush carrying frame 53 within a predetermined range of movement sufficient to engage the depending bristles of the brushes 52 with the upwardly facing surfaces of the eggs 20 which are supported in the pockets 28 on the conveyor 16.

A cleaning liquid, such as hot water, is supplied to the brushes 52 by means of a perforated pipe 92 which is supported in the upper portion of the brush housing 54 and which is connected by a pipe or hose member 93 with a pump 94 mounted in the side wall 12 of the main frame structure 10 and having an inlet opening 95 into the compartment for circulating the water 15 which is maintained in the latter. The water 15 may be heated by steam which is supplied from any suitable source and delivered into the compartment through the pipe 96 having outlet openings 97 in the one end thereof. The pump 94 is provided with a drive pulley 98 which is connected by a drive belt 99 with a pulley 100 on the motor 90.

A fan indicated at 101 is mounted in an upwardly extending blower housing 102 having communication with the open top of the main frame structure 10 at the delivery end 18 of the conveyor 16 beyond the brush housing 54. The fan 101 is provided with a drive pulley 103 which is connected by a drive belt 104 with a suitable pulley 105 on the end of the cross shaft 85. The fan 101 supplies air to the discharge end 18 of the machine to dry the surfaces of the eggs as they are advanced from the washing area.

The eggs 20 are placed on the conveyor 16 at the candling end 17 of the machine and any eggs which are observed to be unsuitable for use are removed by the operator. The conveyor 16 is operated intermittently to advance the successive rows of eggs toward the brush housing 54 with the eggs being rotated on their longitudinal axis by rotation of the cross bars or shafts 22 which carry the pocket forming roller assemblies 23. As the lines of eggs pass beneath the brushes 52 reciprocation of the frame 53 engages the ends of the bristles of the brushes 52 with the top or exposed surfaces of the eggs and scours the same, the action of the bristles tending to loosen any dirt which clings to the shells. The washing fluid supplied to the brushes by the pipe 92 facilitates the cleaning operation and washes the dirt which is loosened by the brushes 52 into the tank where it settles on the bottom and may be removed from time to time. As the conveyor 16 is advanced the eggs 20 are rotated so that the bristles of the brushes 52 strike all surfaces thereof. As the eggs are advanced beyond the washing area, the air delivered by the fan 101 dries the shells and the eggs emerge at the delivery end 18 of the machine in dry and clean condition.

The egg supporting roller assemblies 23 are preferably formed of rubber or similar material of substantial resiliency which will engage the egg surfaces with sufficient friction to rotate the eggs without danger of breakage. However, any other suitable material may be used. Also, the end assemblies 23 on the shafts 22 may be employed to rotate the shafts by arranging the same so that the base portions 25 will engage with the supporting flanges 31 and 32 of the angle members 33 and 34, thereby eliminating the need for rollers 30.

While particular materials and specific details of construction have been referred to in describing the illustrated form of the machine, it will be understood that other materials and variations in construction may be resorted to within the spirit of the invention.

I claim:

1. In an egg washing machine having an upright supporting frame, an egg carrying traveling conveyor arranged on said frame with one of its runs in a horizontal plane, said egg carrying conveyor comprising a pair of laterally spaced chains and end supports mounted at opposite ends of said upright frame, a plurality of parallel, longitudinally spaced cross shafts journaled at opposite ends on the conveyor chains, a traction wheel on each of said cross shafts, a stationary track on said supporting frame which is engaged by the traction wheels on the cross shafts to rotate the latter, a plurality of pairs of roller members fixed on each cross shaft in cooperating relation for receiving thereon eggs to be carried by the conveyor, each pair of roller members on each cross shaft being aligned in the direction of travel of the conveyor with a pair of the roller members on the adjoining cross shaft and cooperating therewith to form pockets for receiving the eggs, each of said roller members comprising a cylindrical base portion and an adjoining tapered portion of truncated cone shape, and the roller members of each pair being axially spaced on the cross shaft with the tapered portion thereof innermost so as to provide for support of an egg at its ends with the central portion of its shell exposed to circulating air for drying the same.

2. In an egg washing machine having a supporting frame, an egg carrying endless traveling conveyor arranged on said supporting frame with one of its runs in a horizontal plane, said egg carrying conveyor comprising a pair of laterally spaced chains, end supports on said frame for said chains, a plurality of parallel cross shafts journaled at opposite ends on the chains and spaced apart in the direction of travel of said conveyor, means to rotate said cross shafts as said conveyor advances along said horizontal run, roller assemblies fixed on said cross shafts for receiving thereon eggs to be carried by the conveyor, the roller assemblies on each cross shaft being aligned in the longitudinal direction with roller assemblies on the adjoining cross shafts and cooperating therewith to form pockets for receiving the eggs, each roller assembly comprising roller sections with cylindrical base portions and adjoining tapered portions of truncated cone shape and with the tapered portions in paired relation and axially spaced on the respective supporting cross shaft and the tapered portions of each pair thereof facing so that the tapered surfaces converge inwardly toward each other whereby to form pockets between the cross shafts for supporting the eggs at their ends with the central portions of the shells exposed to circulating air for drying the same.

3. An egg washing machine comprising an upright elongate housing forming an open top tank, means to supply a washing fluid to said tank, an endless traveling conveyor mounted on end supports fixed in spaced relation in said tank with the upper run thereof extending horizontally above the washing fluid, said conveyor comprising side members and a plurality of longitudinally spaced cross shafts rotatably mounted at their opposite ends thereon, a traction roller on each cross shaft, means mounted in said tank in position for engagement by said traction rollers to rotate said cross shafts, roller assemblies fixed on said cross shafts, the roller assemblies on each cross shaft being aligned in the longitudinal direction with roller assemblies on the adjoining cross shafts and cooperating therewith to form pockets between said shafts for supporting eggs in rotatable relation therein, each roller assembly comprising roller sections with cylindrical base portions and adjoining tapered portions of truncated cone shape and with the tapered portions in paired relation and axially spaced on the respective supporting cross shaft and the tapered portions of each pair thereof facing so that the tapered surfaces converge inwardly toward each other and support the eggs at their ends only with the central portions of the shells exposed, a vertically reciprocable brush holding frame positioned to extend transversely above the upper run of said conveyor, a series of elongate bristle brushes mounted in transversely extending, longitudinally spaced relation on said frame with the bristles of the brushes extending downwardly toward said conveyor a sufficient distance to engage the lower ends of the bristles with the surfaces of eggs carried in the pockets of said conveyor when said brush holding frame is in its lowermost position, means for vertically reciprocating said brush holding frame to intermittently engage the bristles with the eggs, a fluid discharge member mounted above said brush holding frame, means for delivering washing fluid to said discharge member from said tank, and means for blowing air onto the conveyor adjacent said brush holding frame for drying the eggs as they are advanced and rotated in the pockets of the conveyor.

4. An egg washing machine comprising an elongate upright frame forming a tank-like housing, an endless horizontal conveyor comprising laterally spaced chains having the upper runs thereof supported on longitudinally spaced sprockets in said housing, a plurality of longitudinally spaced cross shafts rotatably mounted at their opposite ends on said chains, a traction roller on each shaft, means mounted along said conveyor run in position for engaging said traction rollers to rotate said cross shafts, a plurality of roller assemblies mounted in fixed relation on each cross shaft, said roller assemblies on each cross shaft being aligned in the longitudinal direction with the roller assemblies on the adjacent cross shafts and cooperating therewith to form egg receiving pockets between said shafts, each roller assembly comprising roller members having cylindrical base portions and adjoining tapered portions of truncated cone shape with the tapered portions in paired and axially spaced relation on the respective supporting shaft and with the tapered portions of each pair thereof facing so that the tapered surfaces converge inwardly toward each other so as to form pockets in which the eggs are supported at their ends only with the central portions of the shell exposed, a brush holding frame positioned to extend horizontally above said conveyor, a plurality of elongate bristle brushes mounted in longitudinally spaced relation on said brush holding frame, said brushes having their bristles extending across said conveyor and downwardly in the direction of eggs carried in the pockets of said conveyor, means supporting said brush holding frame for reciprocating movement in a vertical path, means to reciprocate said brush holding frame in said vertical path so as to intermittently engage the bristles of the brushes with eggs advanced by said conveyor to a washing area beneath said brush holding frame, a fluid discharge means mounted above said brush holding frame, means to supply said fluid discharge means with a washing fluid, and means for supplying a drying air to the conveyor in a drying area adjacent said brush holding frame so as to dry the eggs as they leave the washing area.

References Cited in the file of this patent

UNITED STATES PATENTS

| | | |
|---|---|---|
| 626,284 | Lyons | June 6, 1899 |
| 1,074,940 | Freer | Oct. 7, 1913 |
| 1,728,462 | Wyland | Sept. 17, 1929 |
| 1,776,784 | Cramer | Sept. 30, 1930 |
| 1,848,309 | Brogden | Mar. 8, 1932 |
| 1,964,275 | Secundo | June 26, 1934 |
| 2,080,197 | Brandenburg | May 11, 1937 |
| 2,080,198 | Brandenburg | May 11, 1937 |
| 2,442,475 | Swanson | June 1, 1948 |
| 2,531,292 | Page | Nov. 21, 1950 |
| 2,635,267 | Smith | Apr. 21, 1953 |
| 2,731,146 | Page | Jan. 17, 1956 |
| 2,824,318 | Marzolf | Feb. 25, 1958 |